(12) United States Patent
Gwin et al.

(10) Patent No.: US 6,664,329 B2
(45) Date of Patent: Dec. 16, 2003

(54) FLOOR FINISH COMPOSITION

(75) Inventors: Steven R. Gwin, Toledo, OH (US); Steven P. Hanke, Sylvania, OH (US); Kurt B. Bischoff, Temperance, MI (US)

(73) Assignee: Betco Corporation, Toledo, OH (US)

( * ) Notice: Subject to any disclaimer, the term of this patent is extended or adjusted under 35 U.S.C. 154(b) by 109 days.

(21) Appl. No.: 09/954,466

(22) Filed: Sep. 17, 2001

(65) Prior Publication Data

US 2002/0173576 A1 Nov. 21, 2002

Related U.S. Application Data

(63) Continuation-in-part of application No. 09/790,010, filed on Feb. 21, 2001, now abandoned.

(51) Int. Cl.$^7$ .................. C08L 33/02; C08L 33/08; C08L 33/10; C08L 91/06; C08K 5/01
(52) U.S. Cl. ................. 524/556; 524/487; 524/501
(58) Field of Search ................ 524/487, 501, 524/577, 556; 106/3, 10, 11

(56) References Cited

U.S. PATENT DOCUMENTS

| | | | |
|---|---|---|---|
| 4,317,755 A | * | 3/1982 | Gregory .............. 524/476 |
| 4,414,354 A | * | 11/1983 | Slocombe ............ 524/460 |
| 4,546,160 A | | 10/1985 | Brand et al. |
| 4,628,071 A | | 12/1986 | Morgan |
| 4,680,237 A | | 7/1987 | Kenney et al. |
| 4,750,933 A | * | 6/1988 | Brandstetter et al. ....... 106/10 |
| 4,916,171 A | * | 4/1990 | Brown et al. ............ 523/161 |
| 5,081,166 A | * | 1/1992 | Kiehlbauch et al. ....... 523/201 |
| 5,191,002 A | | 3/1993 | Davis |
| 5,237,004 A | * | 8/1993 | Wu et al. ................. 525/85 |
| 5,326,843 A | * | 7/1994 | Lorah et al. ............ 526/318.6 |
| 5,451,627 A | | 9/1995 | Jamasbi |
| 5,532,291 A | | 7/1996 | Wright et al. |
| 5,972,809 A | * | 10/1999 | Faler et al. ............. 442/103 |
| 6,281,298 B1 | * | 8/2001 | Papsin, Jr. ............. 524/419 |

\* cited by examiner

*Primary Examiner*—Callie Shosho
(74) *Attorney, Agent, or Firm*—Emch, Schaffer, Schaub & Porcello Co., L.P.A.

(57) ABSTRACT

This coating composition is useful as a floor finish. The floor finish includes a polymer having a controlled particle size, a controlled particle size distribution, and higher than normal weight percent solids content. This unique polymer provides a floor finish that has a higher than normal solids content and a lower than expected viscosity. The preferred polymer is a vinyl acrylic copolymer. The preferred floor finish has a solids content of 30–40 weight percent and a viscosity of less than 10 centipoise (cps). These unique properties allows the floor finish to be spread with a conventional string mop. Two to three applications of this floor exhibit equal or better gloss and protection than three to six coats of a normal floor finishes having solids of 15–25 percent by weight.

12 Claims, No Drawings

FLOOR FINISH COMPOSITION

This application is a continuation-in-part of Ser. No. 09/790,010 filed Feb. 21, 2001 now abandoned.

TECHNICAL FIELD

This invention relates to coating compositions useful as floor finishes. The floor finishes use a polymer having a unique particle size and a unique particle size distribution and a higher than normal solids content by weight.

BACKGROUND OF THE INVENTION

The floor finish industry has used aqueous floor cleaning, coating and polishing compositions containing acrylic type polymers, a fugitive plasticizer, tributoxyethyl phosphate, surfactants, antifoaming agents, bicarbonate, water, ammonia and other copolymers for some time. Generally the polymers and copolymers employed in these compositions have solids contents of 38–40 percent by weight. The compositions have a solids content of from 15–25 percent by weight. Because of the low solids content, one can apply the finishes with a conventional string mop. Higher solids content finishes are too viscous for standard mopping. Finishes with solids contents of 15–25 percent generally requires 3–6 applications to build up satisfactory film thickness to offer adequate shine and protection.

BRIEF SUMMARY OF THE INVENTION

The coating compositions of this invention includes a polymer having a controlled particle size, a controlled particle size distribution, and a higher than normal solids content by weight. The preferred polymer is an acrylic polymer and more specifically is a copolymer of styrene, acrylates and acrylic acid. The preferred composition has a solids content of 30–40 weight percent and a viscosity of less than 10 centipoise (cps). More preferably, the composition has a solids content ranging from 30–37 weight percent. These unique properties allows the floor finish to be applied with a conventional string mop. Once the viscosity of a floor finish is above 10 centipoise, the finishes become difficult to apply with a conventional mop. Because of the higher percent by weight solids content, only 2–4 applications are required to build up adequate shine and protection rather than 3–6 required by conventional floor finishes containing 15–25 weight percent by solids. The solids content is determined by testing according to ASTM Specification D-2834.

DETAILED DESCRIPTION OF THE INVENTION

The polymer we use in our floor finish may vary widely. The polymer may be any polymer suitable for use in a floor finish. The key is that the polymer have the following controlled particle size, controlled particle size distribution and a higher than normal solids content.

Generally, the polymer has an average particle size ranging from 150–300 nanometers (nm). Preferably, the range is 150–250 nm. Generally, the particle size distribution is a Gaussian distribution with ~80% of the particles falling within +/−30 nanometers of the average particle size.

Generally, the solids content of the polymer is 40–60 weight percent. Preferably, the solid content of the polymer ranges from 50–60 weight percent.

Preferably, the polymer is an acrylic polymer. These include polymers, copolymers or terpolymers of acrylic acid or methacrylic acid with esters of acrylic or methacrylic acid, hydroxyethyl methacrylate methacrylonitrile, acrylonitrile or the like. Other monomers may be employed in this invention, including methyl methacrylate, butyl acrylate, ethyl acrylate, 2-ethylhexyl acrylate.

Other unsaturated acid monomers can also be substituted in part for the preferred methacrylic acid. Such unsaturated acid monomers include maleic acid, crotonic acid, fumaric acid and itaconic acid.

The vinyl component preferably is styrene or a monoalkenyl aromatic monomer such as methyl styrene or tertiary butyl styrene. It is possible to substitute for a portion of the water insoluble vinylic monomer, a relatively soluble vinylic monomer, such as vinyl acetate and methyl acrylate.

Typical preferred copolymers include; styrene/butyl acrylate/methacrylic acid, styrene/ethyl acrylate/methacrylic acid, and styrene/butyl acrylate/ethyl acrylate, methacrylic acid. Other polymers include; styrene/butyl acrylate/acrylic acid, styrene/ethyl acrylate/acrylic acid, and a styrene/butyl acrylate/ethyl acrylate/acrylic acid, and methyl styrene/styrene/butyl acrylate/ethyl acrylate/methacrylic acid/acrylic acid.

The floor finish may contain one or more polyalkene waxes such as an oxidized, low-density ethylene homopolymer; an oxidized, low-density ethylene/acrylic acid copolymer; or a chemically modified polypropylene at up to 10 weight percent.

The floor finish may contain one or more non-fugitive plasticizers such as tributoxyethyl phosphate, 2,2,4-trimethyl-1,3 pentanediol diisobutyrate, dibutyl phthalate, dioctyl phthalate, and caprolactam. Generally, tributoxyethyl phosphate and dibutyl phthalate are the preferred non-fugitive plasticizers at up to 10 weight percent.

The floor finish may contain one or more fugitive plasticizers/coalescents such as ethylene glycol, diethylene glycol methyl ether, diethylene glycol ethyl ether, dipropylene glycol methyl ether, dipropylene glycol ethyl ether, diethylene glycol monobutyl ether acetate, glycol 2-ethylhexyl ether, and 2,2,4-trimethyl-1,3-pentanediol mono (2-methyl propanoate). Generally diethylene glycol ethyl ether and dipropylene glycol methyl ether are the preferred fugitive plasticizer/coalescents at up to 10 weight percent.

The floor finish may include optional ingredients defined herein below. The finish may optionally include up to 0.05 weight percent of an antifoaming agent.

The finish may also include up to 0.3 weight percent formaldehyde or benzoisothiazoline to ensure "quick kill" of any organisms with which the instant composition may be contaminated, particularly during manufacture and packaging. The formaldehyde, if employed, can be conveniently added as a 37% solution in water (formalin).

The finish optionally may include, as a film modifying agent, either an alkali-soluble rosin ester resin or an alkali-soluble low molecular weight copolymer of styrene and maleic anhydride in order to enhance leveling and the hardness of the deposited film. The rosin ester resin or the styrene/maleic anhydride copolymer can be employed in a concentration up to about 5 weight percent of the instant composition.

The floor finish may be applied to flooring using well known techniques, e.g. by mopping with a string mop or other floor finish applicator. The composition should be applied to flooring as an even thin layer and allowed to dry thoroughly.

The floor finish essentially is a translucent to opaque liquid having good storage stability. The film deposited there from is clear and resistant to discoloration, has high gloss, and exhibits excellent wearability, scuff resistance and water spotting resistance. The floor finish passes the ASTM D 2047 test for slip resistance.

The composition or floor finish may be applied to a variety of floor substrates including but not limited to vinyl tile, vinyl composition tile, vinyl asbestos tile, concrete, terrazzo, marble, quarry tile, ceramic tile, and wood.

The following examples illustrate this finish without being limited thereto.

EXAMPLE I

| Component | Weight Percent |
|---|---|
| Water | to 100 |
| Acrylate Vinyl Copolymer Emulsion | 40–60 |
| Polyalkene Wax Emulsion | 3–10 |
| Resin Solution | 0–5 |
| Dialkene Glycol Alkyl Ether | 3–8 |
| Tributoxyethyl Phosphate | 2–7 |
| Fluorochemical wetting agent | 0–1 |
| Optical brightening agent | 0–1 |
| Antifoaming Agent | 0–0.05 |
| Preservative | 0–1 |

EXAMPLE II

| Component | Weight Percent |
|---|---|
| Water | to 100 |
| Acrylate Vinyl Copolymer Emulsion | 40–55 |
| Polyalkene Wax Emulsion | 5–10 |
| Resin Solution | 0–5 |
| Dialkene Glycol Alkyl Ether | 4–8 |
| Tributoxyethyl Phosphate | 3–6 |
| Dibutyl Phthalate | 0–3 |
| Antifoaming Agent | 0–0.05 |
| Formalin | 0–0.3 |

EXAMPLE III

| Component | Weight Percent |
|---|---|
| Water | to 100 |
| Acrylate Vinyl Copolymer Emulsion | 40–50 |
| Polyalkene Wax Emulsion | 3–8 |
| Polyalkene/Acrylic Acid Copolymer Emulsion | 3–8 |
| Tributoxyethyl Phosphate | 2–5 |
| Dibutyl Phthalate | 2–5 |
| Dialkene Glycol Alkyl Ether | 4–7 |
| 2,2,4-Trimethyl-1,3-Pentanediol Mono (2,2 Methyl Propanoate) | 0–3 |
| 2,2,4-Trimethyl-1,3-Pentanediol Diisobutyrate | 0–3 |
| Antifoaming Agent | 0–0.05 |
| Benzoisothiazoline | 0–0.3 |

EXAMPLE IV

| Component | Weight Percent |
|---|---|
| Water | to 100 |
| Acrylate Vinyl Copolymer Emulsion | 40–50 |
| Polyalkene Wax Emulsion | 4–7 |
| Polyalkene/Acrylic Acid Emulsion | 0–2 |
| Tributoxyethyl Phosphate | 3–5 |
| Dialkene Glycol Alkyl Ether | 4–8 |
| Antifoaming Agent | 0–0.05 |
| Formalin | 0–0.3 |

As a result of the unique particle size of the polymer the floor finish in this invention, it is easier to remove (strip) than conventional floor finishes. Also, it is possible to extend the usable life expectancy of vinyl and vinyl composition tile due to the ease of removability associated with this floor finish.

In addition to these embodiments, persons skilled in the art can see that numerous modifications and changes may be made to the above invention without departing from the intended spirit and scope thereof.

We claim:

1. A floor finish composition comprising an acrylic polymer, wherein the acrylic polymer has an average particle size ranging from 150 nanometers to 300 nanometers;

wherein the acrylic polymer has a solids content of 40–60 weight percent;

wherein the floor finish composition has a solids content of 30–40 weight percent; and wherein the floor finish composition has a viscosity of less than 10 centipoise.

2. A composition according to claim 1 comprising a polymer having an average particle size range from 150 nanometers to 250 nanometers.

3. A composition according to claim 1 having a polymer having a Gaussian particle size distribution with about 80% of the particles falling within +/−30 nanometers of the average particle size.

4. A composition according to claim 1 comprising a polymer having a solids content of 50–60 weight percent.

5. A composition according to claim 1 having a solids content of 30–37 weight percent and a viscosity of less than 10 centipoise.

6. A composition according to claim 1 wherein the polymer is a styrene acrylic copolymer.

7. A composition according to claim 1 wherein the composition is a floor finish that exhibits dry times, leveling and removability comparable to conventional acrylic floor finishes, wherein the conventional acrylic floor finishes comprise an acrylic polymer has a solids content of 38–40 weight percent; and wherein the conventional coating composition has a solids content of 15–25 weight percent.

8. A composition according to claim 7 wherein the composition is a floor finish that exhibits equal or better gloss and protection after 2–4 applications than exhibited after 3–6 applications of the conventional floor finish.

9. A composition according to claim 1 comprising:

| Component | Weight Percent |
|---|---|
| Water | to 100 |
| Acrylate Vinyl Copolymer Emulsion | 40–60 |
| Polyalkene Wax Emulsion | 3–10 |
| Resin Solution | 0–5 |
| Dialkene Glycol Alkyl Ether | 3–8 |
| Tributoxyethyl Phosphate | 2–7 |
| Fluorochemical wetting agent | 0–1 |
| Optical brightening agent | 0–1 |
| Antifoaming Agent | 0–0.05 |
| Preservative | 0–1. |

10. A composition according to claim 1 comprising:

| Component | Weight Percent |
|---|---|
| Water | to 100 |
| Acrylate Vinyl Copolymer Emulsion | 40–55 |
| Polyalkene Wax Emulsion | 5–10 |
| Resin Solution | 0–5 |
| Dialkene Glycol Alkyl Ether | 4–8 |
| Tributoxyethyl Phosphate | 3–6 |
| Dibutyl Phthalate | 0–3 |
| Antifoaming Agent | 0–0.05 |
| Formalin | 0–0.3. |

11. A floor finish according to claim 1 comprising:

| Component | Weight Percent |
|---|---|
| Water | to 100 |
| Acrylate Vinyl Copolymer Emulsion | 40–50 |
| Polyalkene Wax Emulsion | 3–8 |
| Polyalkene/Acrylic Acid Copolymer Emulsion | 3–8 |
| Tributoxyethyl Phosphate | 2–5 |
| Dibutyl Phthalate | 2–5 |
| Dialkene Glycol Alkyl Ether | 4–7 |
| 2,2,4-Trimethyl-1,3-Pentanediol Mono (2,2 Methyl Propanoate) | 0–3 |
| 2,2,4-Trimethyl-1,3-Pentanediol Diisobutyrate | 0–3 |
| Antifoaming Agent | 0–0.05 |
| Benzoisothiazoline | 0–0.3. |

12. A floor finish according to claim 1 comprising:

| Component | Weight Percent |
|---|---|
| Water | to 100 |
| Acrylate Vinyl Copolymer Emulsion | 40–50 |
| Polyalkene Wax Emulsion | 4–7 |
| Polyalkene/Acrylic Acid Emulsion | 0–2 |
| Tributoxyethyl Phosphate | 3–5 |
| Dialkene Glycol Alkyl Ether | 4–8 |
| Antifoaming Agent | 0–0.05 |
| Formalin | 0–0.3. |

* * * * *